(12) United States Patent
Tai et al.

(10) Patent No.: US 9,821,713 B2
(45) Date of Patent: Nov. 21, 2017

(54) IN-VEHICLE LIGHTING DEVICE AND OPERATING METHOD

(71) Applicant: JET Optoelectronics, Taipei (TW)

(72) Inventors: Chien-Hung Tai, Taipei (TW); Michael Tai-Hao Wen, Taipei (TW)

(73) Assignee: JET OPTOELECTRONICS CO., LTD., Taipei (TW)

( * ) Notice: Subject to any disclaimer, the term of this patent is extended or adjusted under 35 U.S.C. 154(b) by 736 days.

(21) Appl. No.: 14/047,793

(22) Filed: Oct. 7, 2013

(65) Prior Publication Data

US 2015/0100203 A1 Apr. 9, 2015

(51) Int. Cl.
*B25J 15/04* (2006.01)
*G01B 7/008* (2006.01)
*G01B 7/012* (2006.01)
*B60Q 3/85* (2017.01)
*B60Q 3/74* (2017.01)
*B60Q 3/80* (2017.01)

(52) U.S. Cl.
CPC ............... *B60Q 3/85* (2017.02); *B60Q 3/745* (2017.02); *B60Q 3/80* (2017.02)

(58) Field of Classification Search
None
See application file for complete search history.

(56) References Cited

U.S. PATENT DOCUMENTS

| 4,207,611 A * | 6/1980 | Gordon ................ G01R 31/007 324/503 |
| 7,251,789 B2 * | 7/2007 | Obradovich ........ B60R 16/0231 701/23 |
| 7,526,367 B2 | 4/2009 | Schofield |
| 2004/0154040 A1 | 8/2004 | Ellis |
| 2004/0239243 A1 * | 12/2004 | Roberts ..................... B60L 1/14 313/512 |
| 2005/0015805 A1 | 1/2005 | Iwamura |
| 2005/0102697 A1 | 5/2005 | Vitito |
| 2005/0203674 A1 * | 9/2005 | Obradovich ....... B60G 17/0195 701/1 |
| 2005/0207086 A1 * | 9/2005 | Degner ..................... F01L 9/04 361/160 |
| 2006/0066567 A1 * | 3/2006 | Scharenbroch ........ G02B 27/01 345/156 |
| 2006/0200285 A1 * | 9/2006 | Obradovich ....... B60G 17/0195 701/32.3 |
| 2006/0288379 A1 | 12/2006 | Vitito |
| 2007/0153139 A1 * | 7/2007 | Turner ................ B60R 11/0211 348/837 |
| 2008/0250462 A1 | 10/2008 | Crohas |
| 2008/0252798 A1 | 10/2008 | Vitito |

(Continued)

FOREIGN PATENT DOCUMENTS

JP 2013125783 A * 6/2013

*Primary Examiner* — Jean-Paul Cass

(74) *Attorney, Agent, or Firm* — Gokalp Bayramoglu

(57) ABSTRACT

The invention uses the backlight of a display monitor such as LCD monitor or OLED monitor as the lighting to replace dome light lamp in a vehicle.

The in-vehicle lighting device has an input circuit for inputting commands to generate the dome light, a control circuit for receiving the commands and outputting an equivalent panel signal, and a display monitor for receiving the equivalent panel signal and emitting the dome light based on the equivalent panel signal.

5 Claims, 19 Drawing Sheets

(56) References Cited

U.S. PATENT DOCUMENTS

| | | | |
|---|---|---|---|
| 2009/0096937 A1* | 4/2009 | Bauer | B60R 1/12 348/739 |
| 2009/0138920 A1 | 5/2009 | Anandpura | |
| 2009/0140669 A1* | 6/2009 | Masten, Jr. | H05B 37/02 315/294 |
| 2010/0005496 A1 | 1/2010 | Ellis | |
| 2010/0304349 A1 | 12/2010 | Kunin | |
| 2011/0106375 A1 | 5/2011 | Gurusamy Sundaram | |
| 2012/0068607 A1* | 3/2012 | Farley | H05B 33/0818 315/130 |
| 2012/0086247 A1 | 4/2012 | Liu | |
| 2012/0120239 A1* | 5/2012 | Hutzel | B60R 1/008 348/143 |
| 2012/0153839 A1* | 6/2012 | Farley | H05B 33/0869 315/152 |
| 2012/0233644 A1 | 9/2012 | Rao | |
| 2013/0016209 A1 | 1/2013 | Taylor | |
| 2013/0021293 A1* | 1/2013 | Nakai | G06F 1/1626 345/174 |
| 2013/0134730 A1* | 5/2013 | Ricci | G06F 9/54 296/24.34 |
| 2013/0144463 A1* | 6/2013 | Ricci | G06F 9/54 701/1 |
| 2013/0151111 A1 | 6/2013 | Skelton | |
| 2013/0157647 A1 | 6/2013 | Kolodziej | |
| 2013/0200991 A1 | 8/2013 | Ricci | |
| 2013/0226369 A1 | 8/2013 | Yorio | |
| 2013/0334559 A1* | 12/2013 | Vdovin | H01L 33/507 257/98 |
| 2014/0109080 A1* | 4/2014 | Ricci | G06F 8/61 717/174 |

\* cited by examiner

IN-VEHICLE LIGHTING DEVICE AND OPERATING METHOD

BACKGROUND

Vehicles such as cars, buses, trucks, airplanes, and trains come with inside lighting device to provide the illumination in dark environments such as at night or in the tunnel. A lamp is usually installed on the ceiling of the interior of a car as an example of the lighting device, which is also called car dome light. The lamp has two or three position switches that control the operation of the lamp. The lamp may be turned on or turned off using the switches. The light emitted from the lamp is usually producing a single color. Once the lamp is installed in the car a user cannot change the color of the light. The lamp is also fixed and the emitting direction of the light cannot be changed or the light cannot be focused on a certain direction.

SUMMARY OF THE INVENTION

The invention uses the backlight of display monitor such as LCD monitor or OLED monitor as the lighting to replace dome light lamp in a vehicle.

An object of the invention is to provide an in-vehicle lighting device inside a vehicle for emitting dome light. The in-vehicle lighting device comprises an input circuit for inputting commands comprising characteristic of the dome light, a control circuit for receiving the commands and outputting a panel signal carrying information of the characteristic, and a display monitor for receiving the panel signal to emit the dome light or display a plurality of multimedia contents based on the panel signal. The input circuit is just an embodiment of controlling the operation of the in-vehicle lighting device. There can be more advanced ways of controlling the in-vehicle lighting device such as with an application on a smart phone or on other smart devices.

Another object of the invention is to provide an operating method executed by the in-vehicle lighting device. The operating method comprises: inputting the commands comprising characteristic of the dome light; generating the panel signal carrying information of the characteristic based on the commands; and emitting the dome light based on the panel signal.

DETAILED DESCRIPTION OF PREFERRED EMBODIMENTS

The display monitor of the invention is usually a part of an entertainment device which usually can play a multimedia disc such as a DVD and can accept and play audio and video signals from an external source. Therefore, this display monitor as described in the invention doubles as an entertainment monitor and an in-vehicle lighting device, as shown in FIGS. 10 and 11. It should be understood that even though FIGS. 10 and 11 show the display monitor installed on the ceiling of the vehicle as an overhead monitor, the monitor can be installed anywhere inside the vehicle as appropriate. Light characteristics such as shape, color, brightness can be changed and adjusted by controlling the display monitor. When closed, the display monitor's screen is facing outward rather than inward and can be pulled down and be rotated by user to adjust the direction of the dome light, as shown in FIG. 10A-E. Furthermore, an advanced monitor can have an operating system installed on it to provide more options to the users. They can draw a custom shape and fill it with any color, much the same way as one can do with the Microsoft Paint program installed on a Windows operating system FIG. 5D. They can even upload a small graphical animation, often in the form of a GIF file, into the monitor to be played when the car dome light is turned on.

Figure 1:
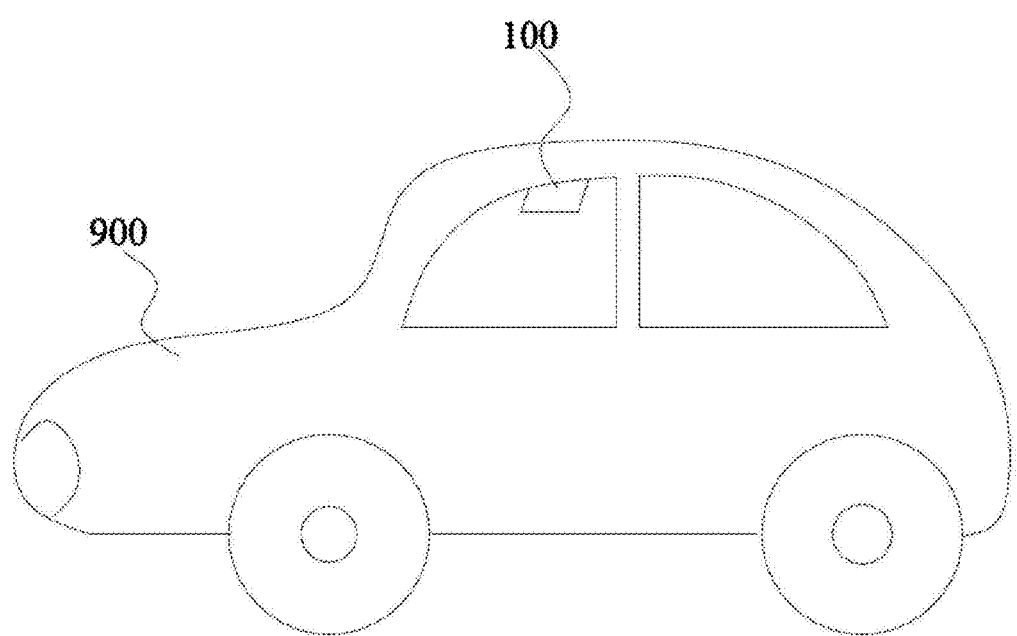
FIG. 1 shows a car with an in-vehicle lighting device of the present invention. A car is an example of a vehicle.
Figure 2:
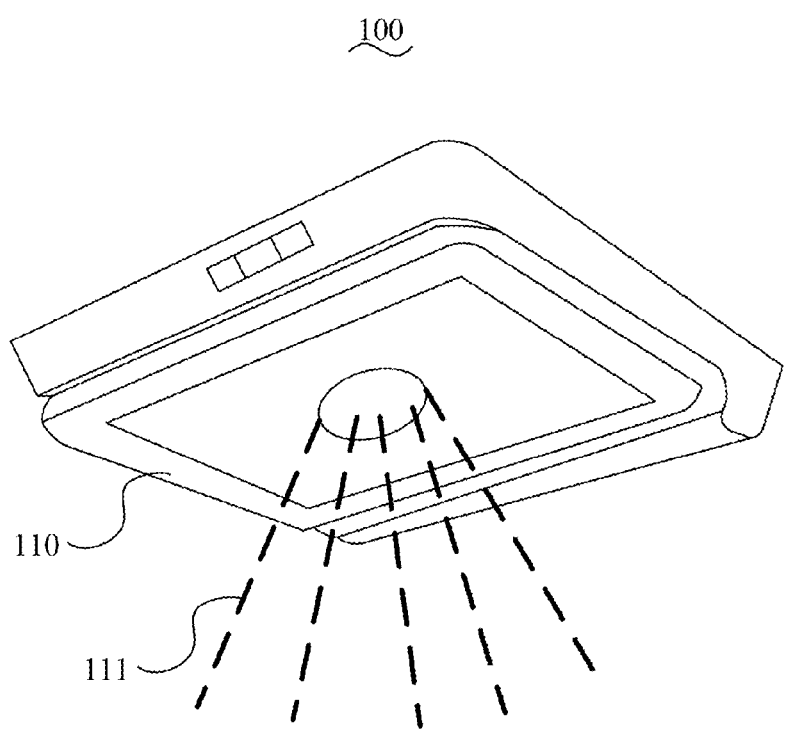
FIG. 2 shows the lighting device emitting dome light in special shape as an example of the type of shape the lighting device is able to emit.

Referring to FIG. 1, car 900 is an embodiment of a vehicle to install the in-vehicle lighting device onto. Car 900 has an in-vehicle lighting device 100 to provide illumination. In-vehicle lighting device 100 includes display monitor 110. Although a display device is used in one embodiment, any light emitting device can be used to generate dome light. Display monitor 110 works as a light source to emit dome light. The color and shape of the dome light emitted by the display monitor can be changed. Referring to FIG. 2, lighting device 100 emits concentrated cylindrical light 111 from the middle section of the display monitor.

Figure 3:
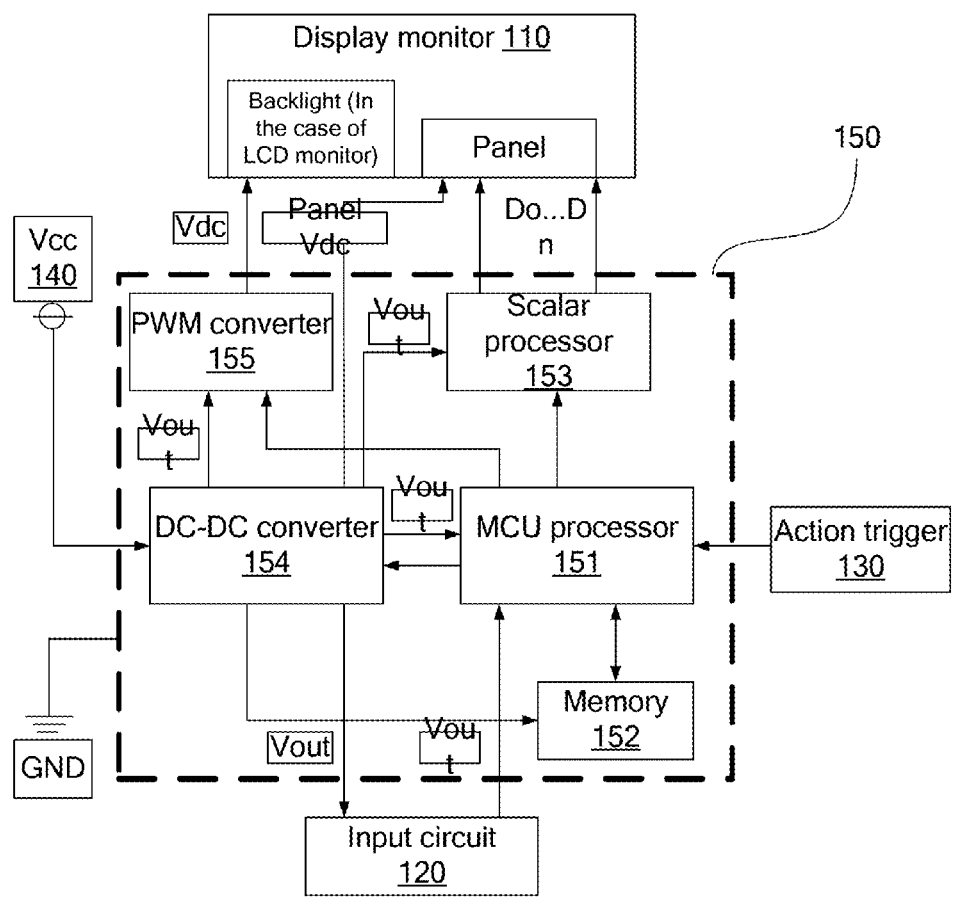
FIG. 3 shows a block diagram of the lighting device.

Referring to FIG. 3, lighting device 100 includes display monitor 110, input circuit 120, action trigger 130, power source 140, and control circuit 150. Display monitor 110, input circuit 120, action trigger 130, and power source 140 are connected to control circuit 150. Input circuit 120 controls the emitting light. A user inputs command to input circuit 120 to control the emitting light characteristics. Input circuit 120 writes settings into control circuit 150. Physical key buttons, physical slide buttons, touch key buttons, touch slide buttons, touch radio buttons, touch checkboxes, touch icons are all examples of user interfaces that can be used by a user to selectively input the commands into input circuit 120. These commands include but not limited to characteristics such as shape, color, and brightness of the dome light and on what conditions the dome light should be emitted. Input circuit 120 may display a group of predetermined shapes of various colors and brightness levels for the user to select when the monitor does not have an operating system installed. Input circuit 120 may allow user to draw a custom figure of any shape, color, and brightness when the monitor has an operating system installed. Action trigger 130 produces trigger signals in response to special vehicle events such as door opening, door closing, engine starting, engine shutting down, vehicle stopping, vehicle moving, vehicle turning. Power source 140 is for supplying voltage to control circuit 150. Control circuit 150 is for receiving the voltage and supplying corresponding split voltages to other components such as display monitor 110 and input circuit 120, and is also for receiving the commands and the trigger signals and outputting an panel signal to display monitor 110. Wherein the panel signal carries information of the characteristic. Display monitor 110 is activated by the split voltages and performs corresponding function based on the panel signal.

Figure 4A:
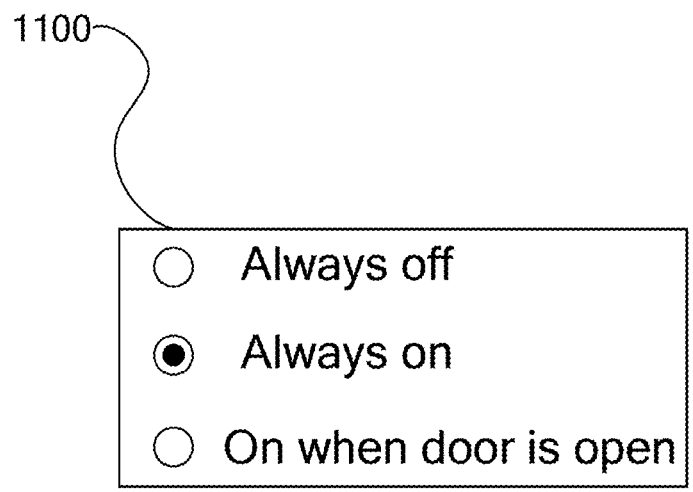
FIGS. 4A-C show graphical user interfaces of setting the lighting device.
Figure 4B:
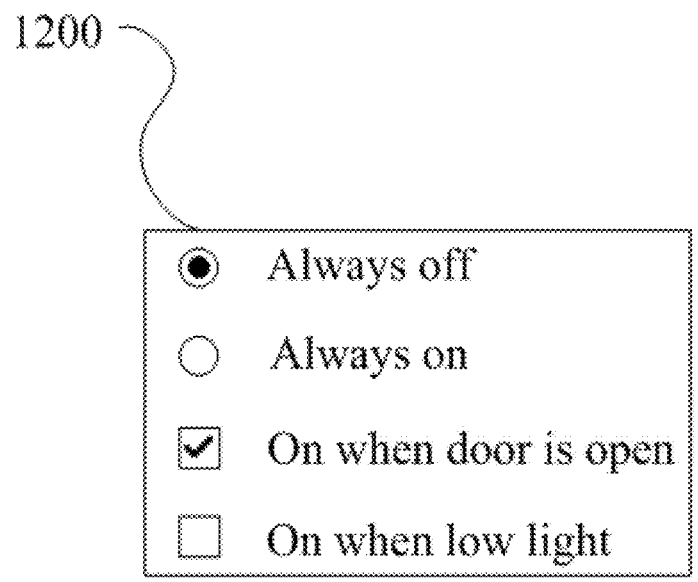
Figures 4C, 5A:
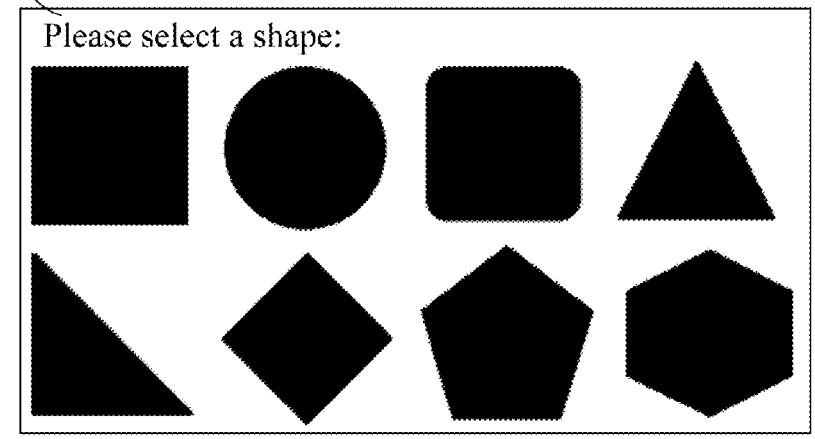
FIGS. 5A-D show various options of shapes, colors, brightness, and also a sample drawing application of the lighting device.

FIGS. 4A-C depict various graphical user interfaces of input circuit 120. FIG. 4A shows a graphical user interface 1100 with three radio buttons for user to select one, comprising three options 'Always off', 'Always on' and 'On when the door is open'. When user selects an option and continues FIG. 6 master flow shows what happens. FIG. 4A is one embodiment of such graphical user interface that works with FIG. 6. There can be other ways of presenting the same options as FIG. 4A.

In a more advanced embodiment input circuit 120 includes the graphical user interfaces as depicted by FIGS. 4B-C. In FIG. 4B, there is a graphical user interface 1200, and user selects 'Always off' option to mean that the monitor screen will be off the whole time except special circumstances as described by the checkboxes below. In this case 'On when door is open' checkbox is selected to mean that the monitor screen is off the whole time except when at least one vehicle door is open. In FIG. 4C, there is a graphical user interface 1300, and user selects 'Always on' option to mean that user wants the monitor screen to be on the whole time. In addition user can select one or two or none of the two checkboxes at the bottom. In this case 'On when door is open' and 'On when low light' are both checked to mean that user wants the monitor screen to be on the whole time, on when at least one door is open, on when the car is in low light environment, and each of these three circumstances can have its own shape of some color and some brightness to be displayed when the monitor screen is on.

Figure 5B:
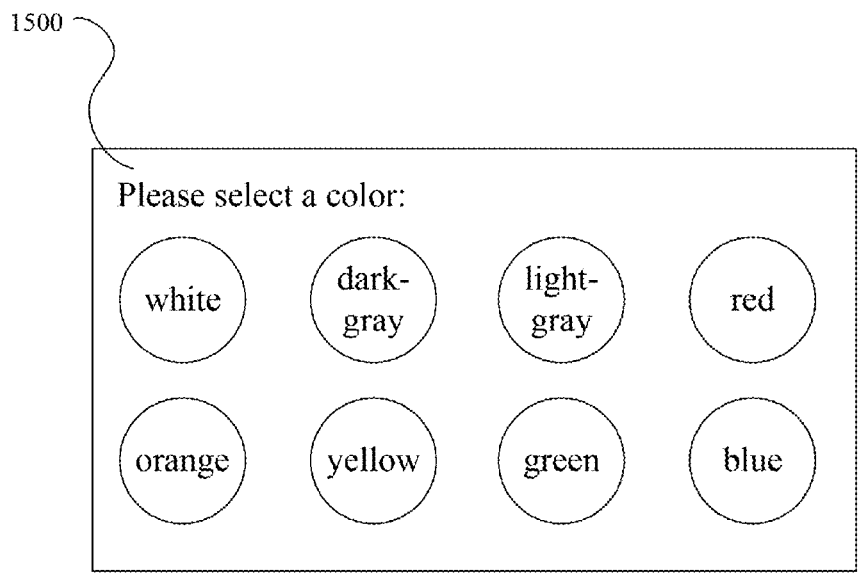
Figure 5C:
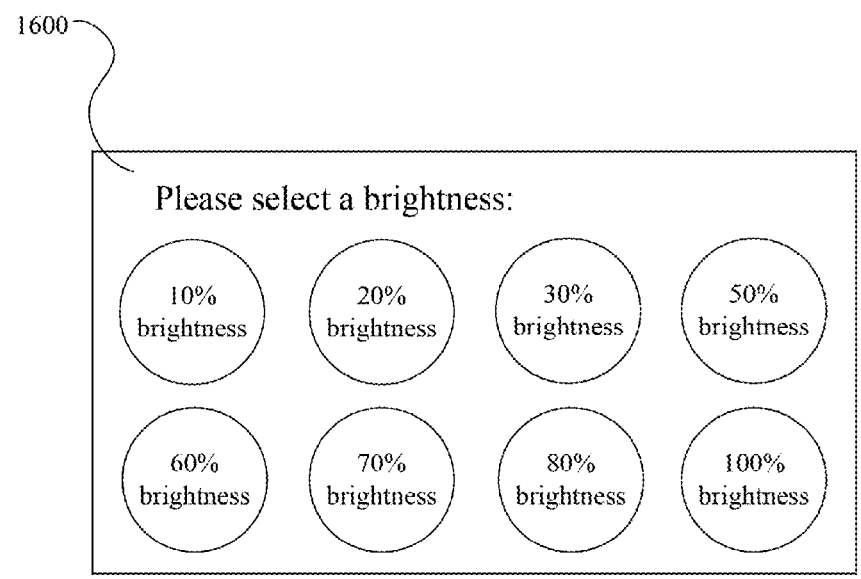

FIGS. 5A-D show various options of shapes, colors, brightness, and also the sample drawing application of the operating system. Per FIGS. 5A-C user will be able to define a separate shape of some color and some brightness for each of the selected options. For example user can specify that when at least one door is open the entire monitor shows white screen, and they can specify that when the doors are all closed the monitor shows gray screen. When user selects any of these options. Always on, On when door is open, On when low light, FIGS. 5A-C are presented to user so that user can define the shape, color, brightness of the dome light for each specific condition. An example flow of control includes following steps: user first selecting 'Always on'; screen showing FIGS. 5A-C; user completing FIGS. 5A-C; screen returning to the menu; user selecting 'On when door is open'; screen showing FIGS. 5A-C; user completing FIGS. 5A-C; screen returning to the menu. FIG. 6 needs to be extended to handle the flow of events and actions corresponding to this embodiment.

FIGS. 5A-C describe the flow of picking a shape, a color, and a brightness level. In FIG. 5A users are presented with a group of preset shapes in user interface 1400. Let's say users select the circle. They click Next (not shown) and go to FIG. 5B's user interface 1500 to select a color from a group of preset colors in the shape of a circle. Let's say users select green. They click Next (not shown) and go to FIG. 5C's user interface 1600 to select a brightness level from a group of preset brightness levels for the color green in the shape of a circle.

Figure 5D:
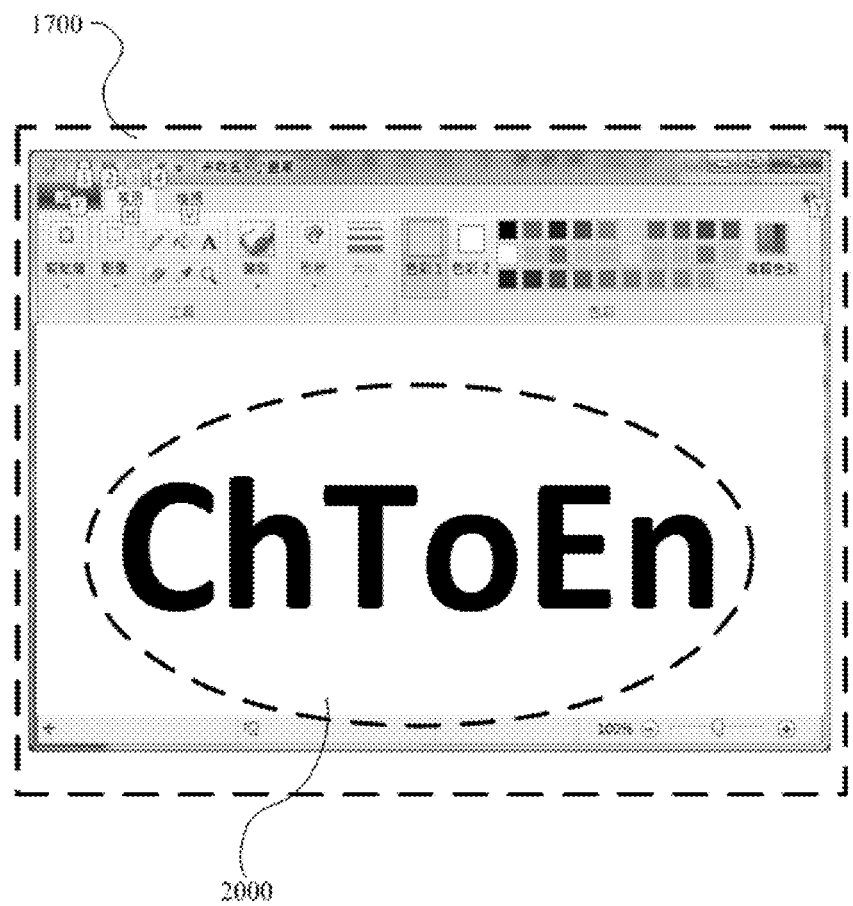
Figure 6:
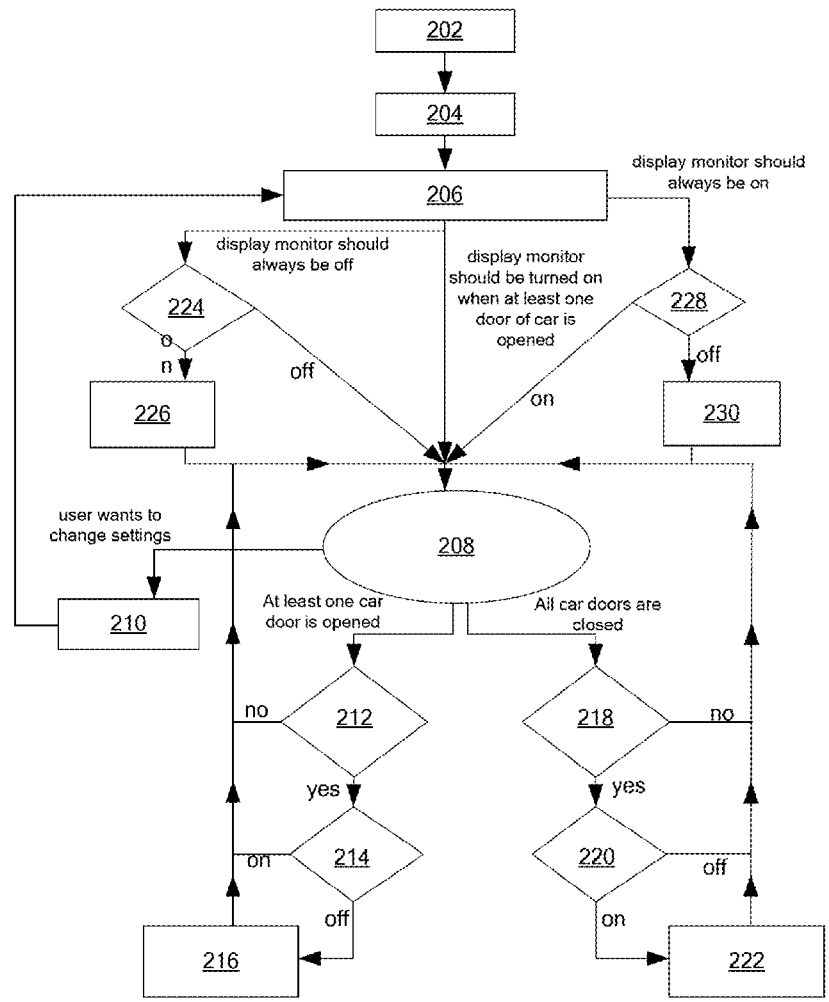
FIG. 6 shows a flowchart of a master flow of the lighting device.

FIG. 5D shows user interface 1700 which is a sample drawing application that the operating system may have installed for user to draw a more complicated shape 2000. It applies to only monitors that have an operating system installed.

Control circuit 150 includes MCU processor 151, memory 152, scalar processor 153, DC-DC converter 154, and PWM converter 155. MCU processor 151 is connected to input circuit 120, action trigger 130, memory 152, scalar processor 153, DC-DC converter 154, and PWM converter 155. DC-DC converter 154 is connected to display monitor 110, input circuit 120, MCU processor 151, memory 152, scalar processor 153, and PWM converter 155. Scalar processor 153 is connected to display monitor 110, MCU processor 151, and DC-DC converter 154. PWM converter 155 is connected to display monitor 110, MCU processor 151, and DC-DC converter 154.

MCU processor 151 receives the commands from input circuit 120, the trigger signals from action trigger 130, and the settings from memory 152, and directly controls memory 152, scalar processor 153, DC-DC converter 154, and PWM converter 155 to perform respective functions. More specifically, MCU processor 151 writes the settings into memory 152 and also reads the settings from memory 152; DC-DC converter 154 generates the needed voltage to drive MCU processor 151, input circuit 120, memory 152, PWM converter 155, scalar processor 153, display monitor 110; MCU processor 151 processes the commands and generates corresponding data including information of dome light such as shape, color, and brightness to control scalar processor 153.

Memory 152 stores the settings of lighting device 100. Memory 152 is usually non volatile memory. The settings indicate statuses of display monitor 110 under different situations of car 900. For instance, the setting may be 'display monitor 110 should always be on' or 'display monitor 110 should always be off' or 'display monitor 110 should be turned on when at least one door of car 900 is opened' or 'display monitor 110 should be turned on when the surrounding light is low as in a low light environment such as night'. Scalar processor 153 receives the data and outputs the panel signal to drive display monitor 110 to emit the corresponding dome light in certain shape, color, direction, and brightness.

DC-DC converter 154 converts the voltage from power source 140 to a first split voltage, a second split voltage, a third split voltage, a fourth split voltage, a fifth split voltage, and a sixth split voltage, wherein the first split voltage is transferred to input circuit 120, the second split voltage is transferred to MCU processor 151, the third split voltage is transferred to memory 152, the fourth split voltage is transferred to scalar processor 153, the fifth split voltage is transferred to PWM converter 155, and the sixth split voltage is transferred to display monitor 110. DC-DC converter 154 always provides the second split voltage to MCU processor 151, and provides the remaining voltages only when MCU processor 151 permits.

PWM converter 155 is for converting the fifth split voltage to a necessary supply voltage under the control of MCU processor 151, and the necessary supply voltage is transferred to display monitor 110. It is noted that PWM converter 155 is needed when display monitor 110 is an LCD monitor, and when display monitor 110 is an OLED monitor, PWM converter 155 is not needed. When display monitor 110 is an LCD monitor, it is activated upon its backlight receiving the necessary supply voltage from PWM converter 155, the sixth split voltage from DC-DC converter 154, and the panel signal from scalar processor 153. When display monitor 110 is an OLED monitor, it is activated upon receiving the sixth split voltage and the panel signal from scalar processor 153.

Referring to FIG. 6, a master flow of an operating method in accordance with one embodiment executed by the lighting device 100 includes the following steps. It is worth noting that FIG. 6 is just an embodiment of such a flow of control. There can be many other embodiments that realize the objects of the invention.

Step 202, the engine of car 900 starts.

Step 204, display monitor 110 is in standby mode, meaning that the system is consuming very low but enough power to let MCU processor 151 ready to take action when being triggered accordingly. The standby mode also captures the situation where MCU processor 151 is powered off but can be triggered to power on immediately upon receiving a signal through one or more pins of an IC (not shown).

Step 206, MCU processor 151 reads the setting from memory 152. When the setting is 'display monitor 110 should be turned on when at least one door of car 900 is opened', the master flow proceeds to step 208. When the setting is 'display monitor 110 should always be off', the master flow proceeds to step 224. When the setting is 'display monitor 110 should always be on', the master flow proceeds to step 228.

Step 208, MCU processor 151 waits for the commands and the trigger signals, and executes corresponding actions after receiving the commands and the trigger signals.

Step 210, MCU processor 151 will run a setting flow, shown in FIG. 7 and depicted later, with some graphical user interfaces, one embodiment of which is shown in FIG. 4A, another embodiment is shown in FIGS. 4B-C, when MCU processor 151 receives a command 'user want to change settings', and after the setting flow the master flow will proceed to step 206.

Step 212, MCU processor 151 reads the setting from memory 152 and checks whether the setting is 'display monitor 110 should be turned on when at least one door of car 900 is opened' when MCU processor 151 receives a trigger signal 'at least one vehicle door is opened'. If the setting is 'display monitor 110 should be turned on when at least one door of car 900 is opened', the master flow will proceed to step 214. If the setting is not 'display monitor 110 should be turned on when at least one door of car 900 is opened', the master flow will proceed to step 208.

Step 214, MCU processor 151 checks whether display monitor 110 is on or off. If display monitor 110 is on, the master flow proceeds to step 208. If display monitor 110 is off, the master flow proceeds to step 216.

Step 216, MCU processor 151 will run a turning on flow, shown in FIG. 8 and depicted later, and after the turning on flow the master flow will proceed to step 208.

Step 218, MCU processor 151 reads the setting from memory 152 and checks whether the setting is 'LCD 110 should be turned on when at least one door of car 900 is opened' when MCU processor 151 receives a trigger signal 'all vehicle doors are closed'. If the setting is 'display monitor 110 should be turned on when at least one door of car 900 is opened', the master flow will proceed to step 220. If the setting is not 'display monitor 110 should be turned on when at least one door of car 900 is opened', the master flow will proceed to step 208.

Step 220, MCU processor 151 checks whether the display monitor 110 is on or off. If display monitor 110 is off, the master flow proceeds to step 208. If display monitor 110 is on, the master flow proceeds to step 222.

Step 222, MCU processor 151 run a turning off flow, shown in FIG. 9 and depicted later, and after the turning off flow the master flow will proceed to step 208.

Step 224, MCU processor 151 checks whether display monitor 110 is on or off. If display monitor 110 is off, the master flow proceeds to step 208. If display monitor 110 is on, the master flow proceeds to step 226.

Step 226, MCU processor 151 will run the turning off flow, and after the turning off flow the master flow will proceed to step 208.

Step 228, MCU processor 151 checks whether display monitor 110 is on or off. If display monitor 110 is on, the master flow proceeds to step 208. If display monitor 110 is off, the master flow proceeds to step 230.

Step 230, MCU processor 151 will run the turning on flow, and after the turning on flow the master flow will proceed to step 208.

Figure 7:
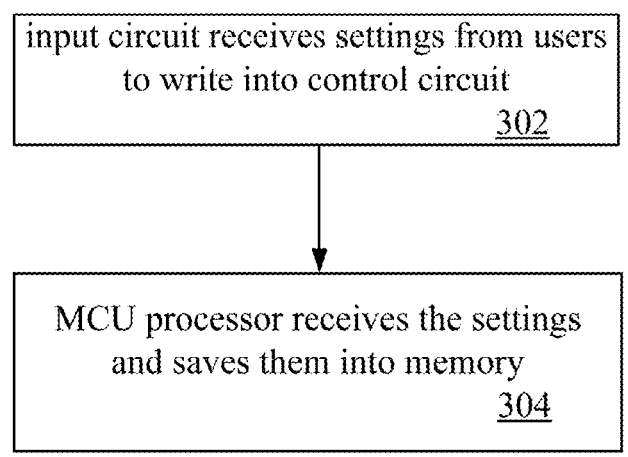
FIG. 7 shows a flowchart of a setting process of the lighting device.

Referring to FIG. 7, the setting flow in accordance with one embodiment includes the following steps.

Step 302, input circuit 120 receives settings from users to write into control circuit 150. In this embodiment, the settings indicate one of 'display monitor 110 should be turned on when at least one door of car 900 is opened', 'display monitor 110 should always be on', and 'display monitor 110 should always be off'. In another embodiment the settings may include 'display monitor 110 should be turned on when the surrounding light is low'. In another embodiment, each applicable setting can have its own shape, color, brightness level. In other embodiments, the settings may indicate other information.

Step 304, MCU processor 151 receives the settings and saves them into memory 152.

Figure 8:
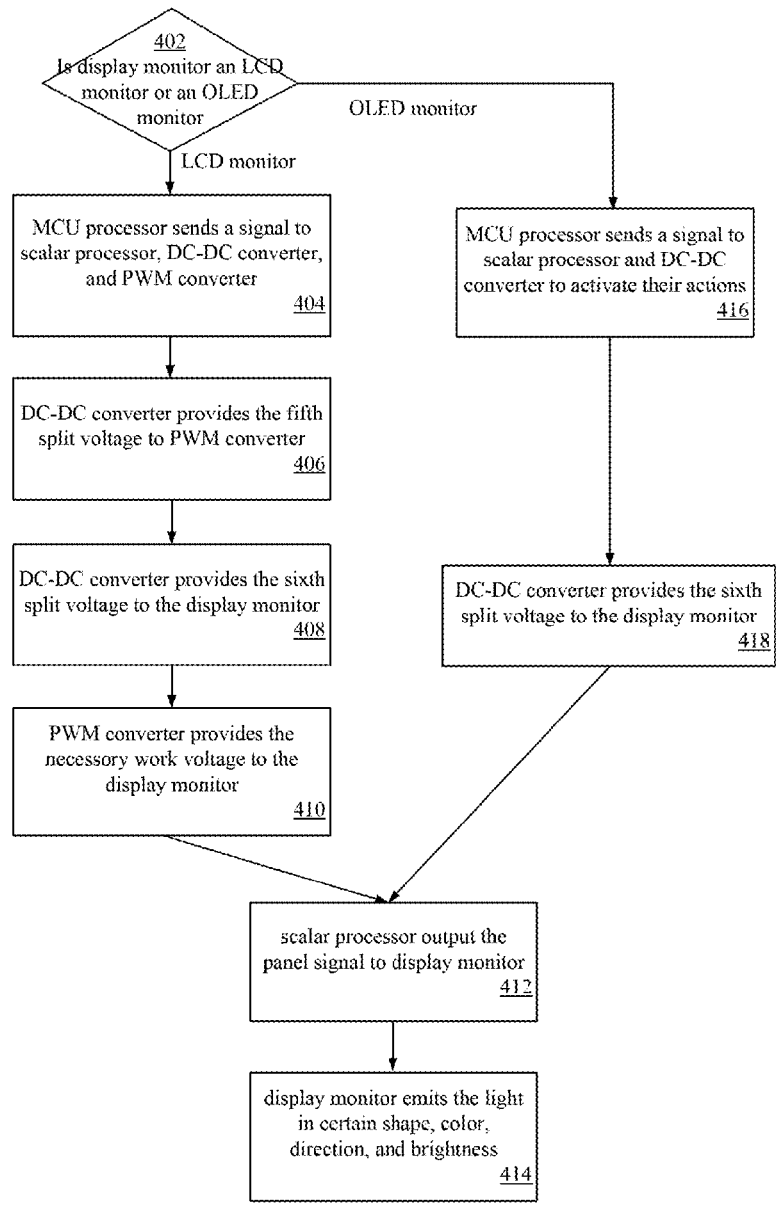
FIG. 8 shows a flowchart of a light turning on flow of the lighting device.

Referring to FIG. 8, the turning on flow in accordance with one embodiment includes the following steps.

Step 402, MCU processor 151 checks whether display monitor 110 is an LCD monitor or an OLED monitor. If display monitor 110 is an LCD monitor, the turning on flow proceeds to step 404. If the display monitor 110 is an OLED monitor, the turning on flow proceeds to step 416.

Step 404, MCU processor 151 sends a signal to scalar processor 153, DC-DC converter 154, and PWM converter 155 to activate their actions.

Step 406, DC-DC converter 154 provides the fifth split voltage to PWM converter 155.

Step 408, DC-DC converter 154 provides the sixth split voltage to the panel of display monitor 110.

Step 410, PWM converter 155 converts the fifth split voltage to the necessary supply voltage, and provides the necessary supply voltage to the backlight of display monitor 110.

Step 412, scalar processor 153 receives the data from MCU processor 151 and outputs the panel signal to display monitor 110.

Step 414, display monitor 110 emits the dome light in certain shape, color, direction, and brightness.

Step 416, MCU processor 151 sends a signal to scalar processor 153 and DC-DC converter 154 to activate their actions.

Step 418, DC-DC converter 154 provides the sixth split voltage to the panel of display monitor 110, and the turning on low proceeds to step 412.

Figure 9:
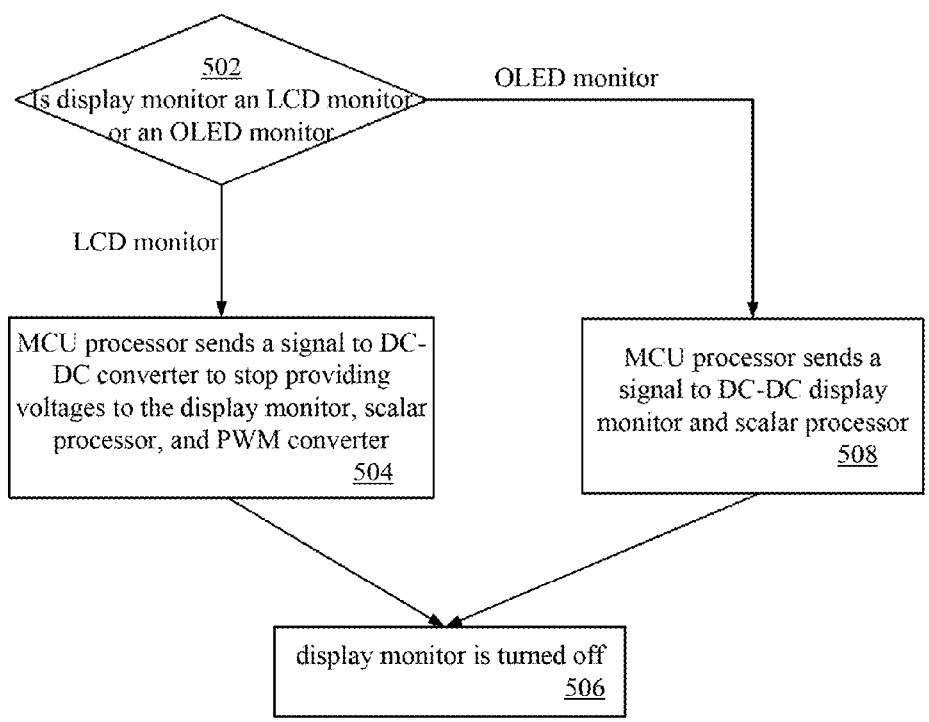
FIG. 9 shows a flowchart of a light turning off flow of the lighting device.
Figure 10A:
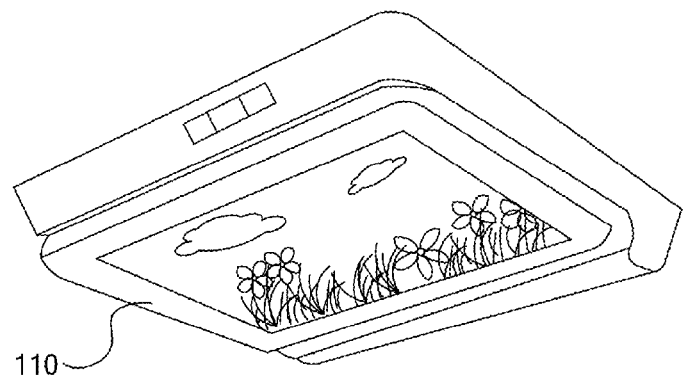
FIG. 10A-E shows the lighting device with an example of an overhead monitor which is playing some multimedia.
Figure 10B:
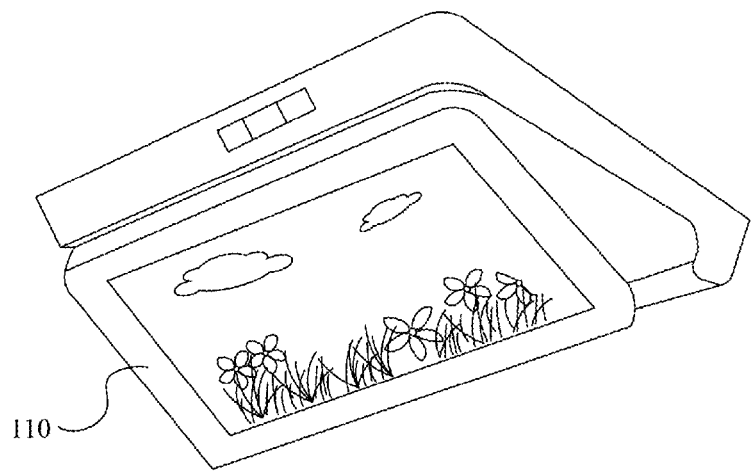
Figure 10C:
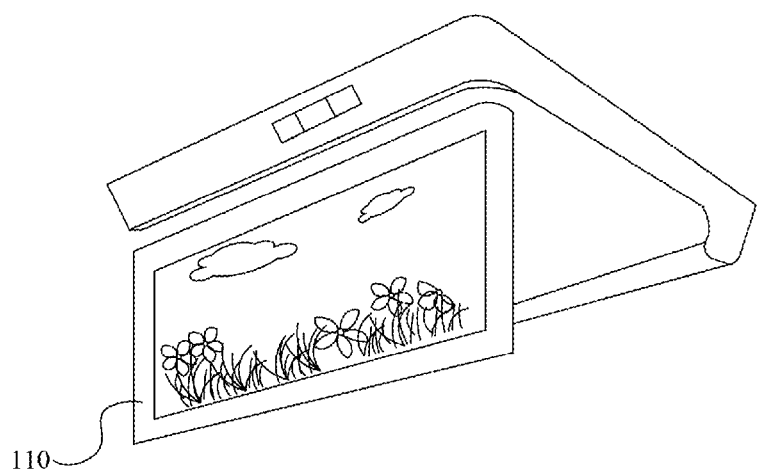
Figure 10D:
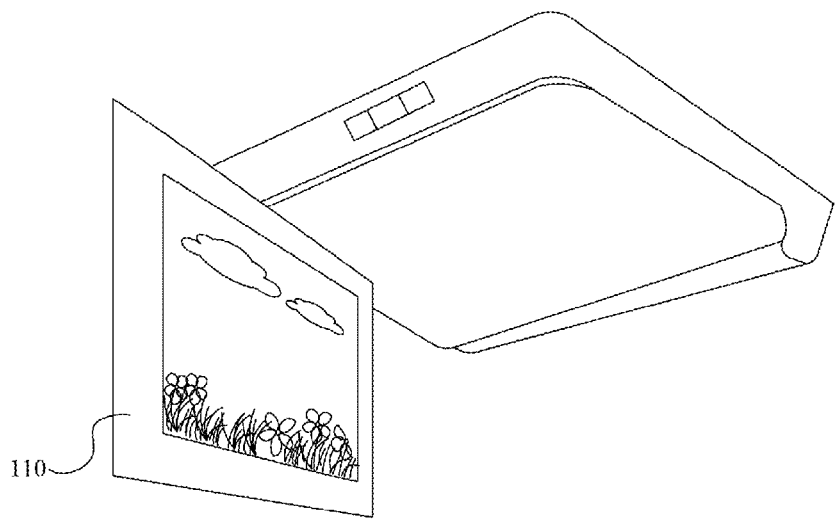
Figure 10E:
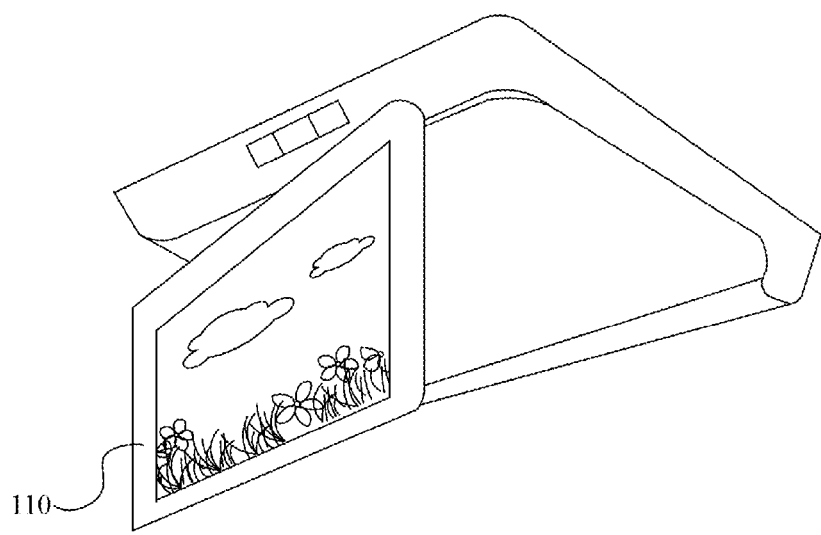
Figure 11A:
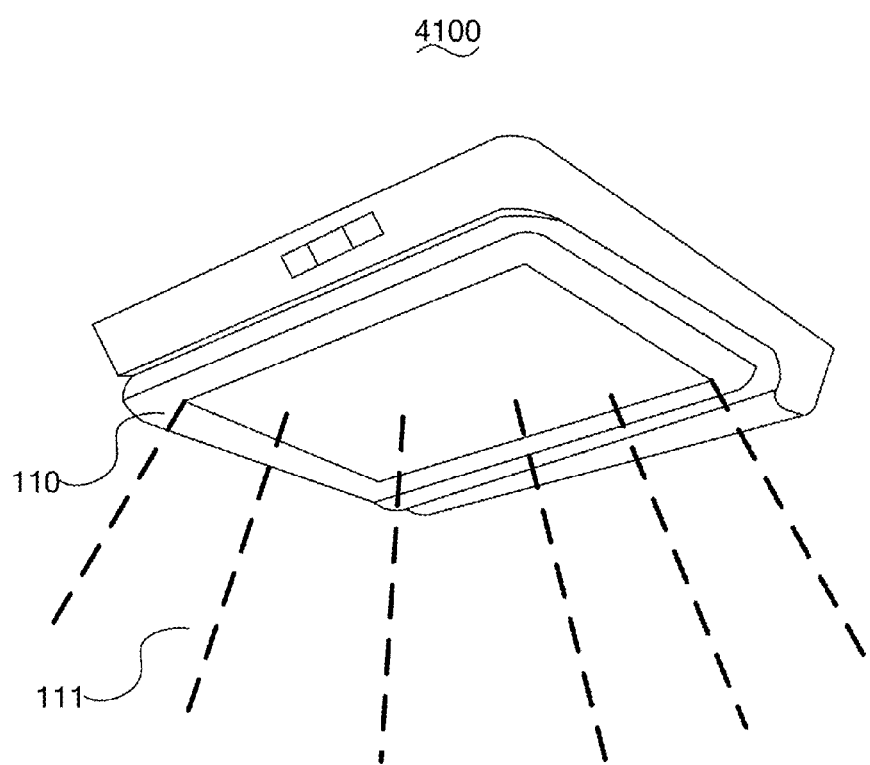
FIG. 11A-E shows the lighting device with an example of an overhead monitor which acts as a dome light and is showing white screen.
Figure 11B:
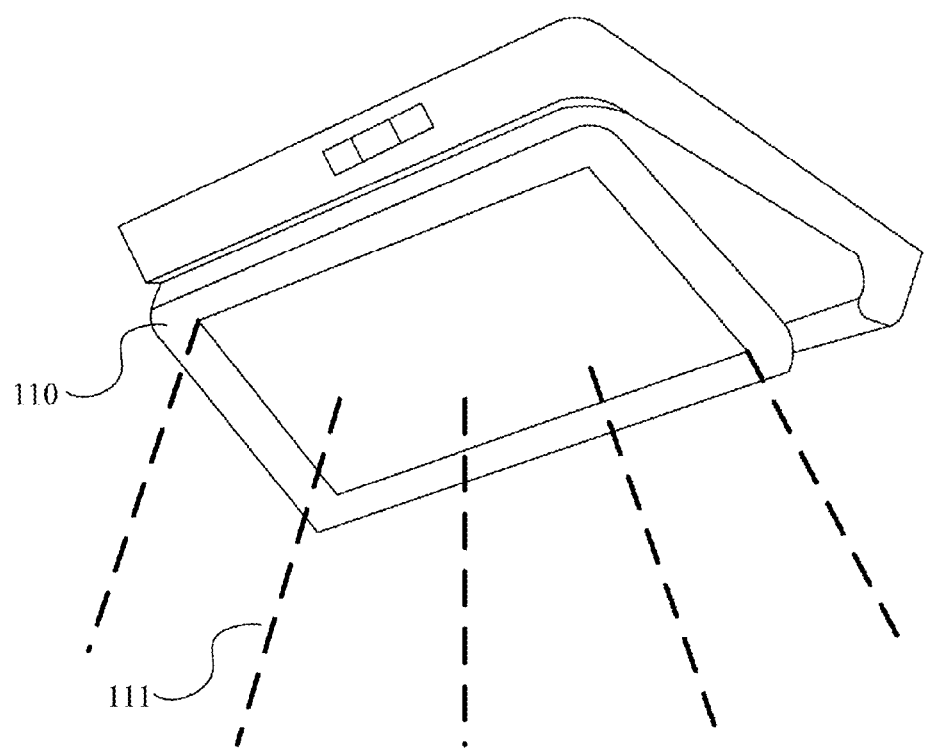
Figure 11C:
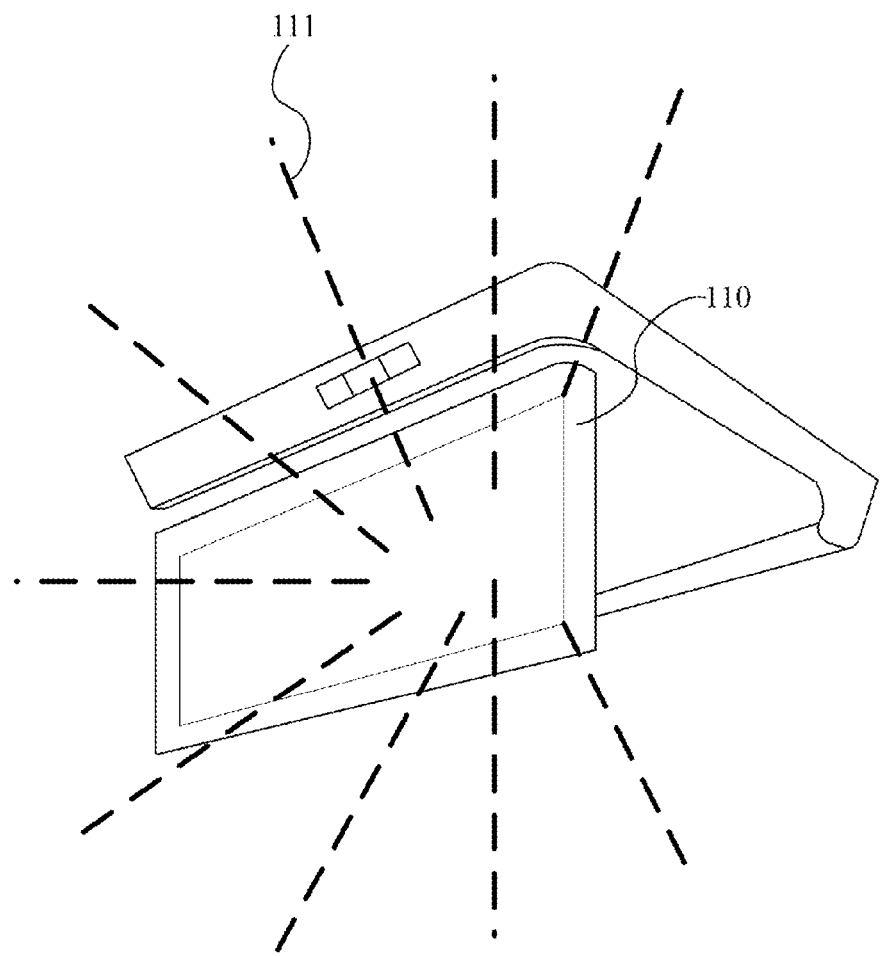
Figure 11D:
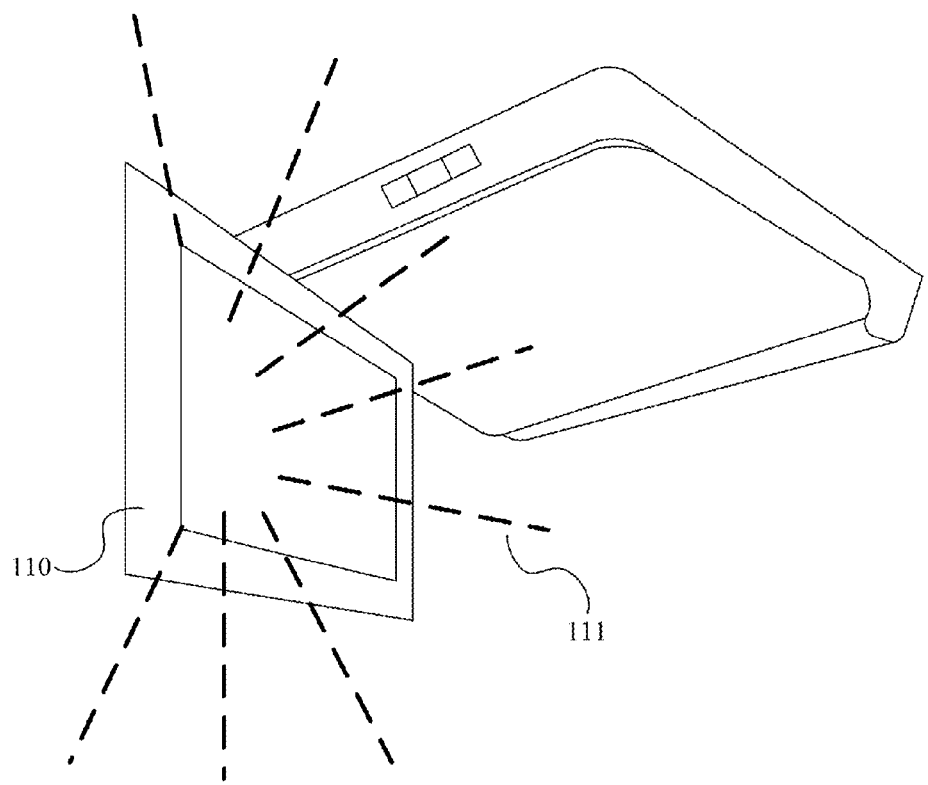
Figure 11E:
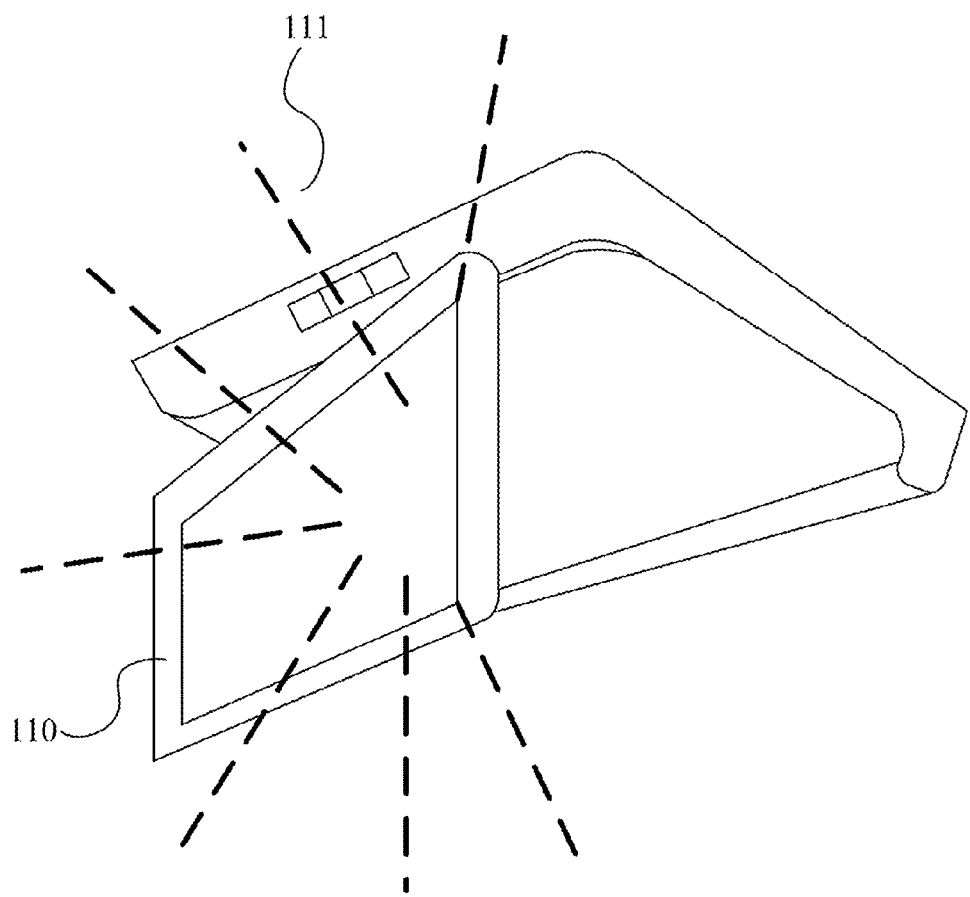

Referring to FIG. 9, the turning off flow in accordance with one embodiment includes the following steps.

Step 502, MCU processor 151 checks whether display monitor 110 is an LCD monitor or an OLED monitor. If display monitor 110 is an LCD monitor, the turning off flow proceeds to step 504. If display monitor 110 is an OLED monitor, the turning off flow proceeds to step 508.

Step 504, MCU processor 151 sends a signal to DC-DC converter 154 to stop providing voltages to the display monitor 110, scalar processor 153, and PWM converter 155, and the turning off flow proceeds to step 506.

Step 506, display monitor 110 is turned off.

Step 508, MCU processor 151 sends a signal to DC-DC converter 154 to stop providing voltages to display monitor 110 and scalar processor 153, and the turning off flow proceeds to step 506.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. An in-vehicle lighting device set inside a vehicle for emitting dome light, the in-vehicle lighting device comprising:
   an input circuit for inputting a plurality of commands comprising characteristic of the dome light, wherein the characteristic of the dome light includes a predetermined and focused shape, color, and brightness of the dome light;
   a scalar processor wherein the scalar processor receives a data from an MCU processor; wherein the data describes the predetermined and focused shape, color, and brightness of the dome light and the scalar processor outputs a panel signal representing the predetermined and focused shape, color and brightness of the dome light, and the panel signal generated by the scalar processor applied to a display monitor to emit the dome light with the characteristics of the predetermined and focused shape, color and brightness, therefore the scalar processor controlling the predetermined focused shape, color, and brightness of the dome light;
   wherein the display monitor receives the panel signal to emit the dome light that matches the predetermined and focused shape, color and brightness characterized in the panel signal received from the scalar processor or display a plurality of multimedia contents based on the panel signal, wherein a backlight of the display monitor or the display monitor itself is used to generate the dome light with the characteristics of the predetermined and focused shape, color and brightness as dome light lamp of the vehicle when the display monitor is used as the dome light lamp of the vehicle, and the backlight of the display monitor or the display monitor itself is used to provide backlight of the multimedia contents when the display monitor is used to play the multimedia contents.

2. The in-vehicle lighting device of claim 1, further comprising a power source for supplying voltage to the control circuit.

3. The in-vehicle lighting device of claim 2, further comprising an action trigger for producing trigger signals in response to vehicle events and providing the trigger signal to the control circuit; wherein the vehicle events comprise door opening, door closing, engine starting, engine shutting down, vehicle stopping, vehicle moving, vehicle turning.

4. The in-vehicle lighting device of claim 3, wherein the input circuit is connected to the control circuit for writing a plurality of settings into the control circuit, and the control circuit comprises an MCU processor for receiving the commands from the input circuit, and the control circuit is capable of receiving the trigger signals from the action trigger; wherein the settings indicate a plurality of statuses of the display monitor under different situations of the vehicle, the setting comprising turning on/off of the display monitor.

5. The in-vehicle lighting device of claim 4, wherein the control circuit comprises a memory for storing the plurality of settings from the MCU processor and for MCU processor to retrieve settings from.

* * * * *